US012741163B2

(12) United States Patent
Kimura

(10) Patent No.: US 12,741,163 B2
(45) Date of Patent: Sep. 22, 2026

(54) HYDRAULIC DEVICE

(71) Applicant: Ogura & Co., Ltd., Ebina (JP)

(72) Inventor: Kiyoshi Kimura, Ebina (JP)

(73) Assignee: Ogura & Co., Ltd., Ebina (JP)

(*) Notice: Subject to any disclaimer, the term of this patent is extended or adjusted under 35 U.S.C. 154(b) by 739 days.

(21) Appl. No.: 17/845,277

(22) Filed: Jun. 21, 2022

(65) Prior Publication Data

US 2022/0314037 A1 Oct. 6, 2022

Related U.S. Application Data

(63) Continuation-in-part of application No. 16/765,562, filed on May 20, 2020, now abandoned.

(51) Int. Cl.
*A62B 3/00* (2006.01)
*B25F 3/00* (2006.01)
*B25F 5/00* (2006.01)

(52) U.S. Cl.
CPC ................ *A62B 3/005* (2013.01); *B25F 3/00* (2013.01); *B25F 5/005* (2013.01)

(58) Field of Classification Search
CPC . A62B 3/005; B25F 3/00; B25F 3/005; F16C 1/00; F16C 1/02; F16C 1/04; F16C 1/08; H01R 43/0427; F16D 1/116; F16D 1/10
See application file for complete search history.

(56) References Cited

U.S. PATENT DOCUMENTS 2,045,572 A * 6/1936 Dow .................. F16D 43/2026 192/114 R
3,410,355 A * 11/1968 Garrett .................. E21B 47/095 175/317

(Continued)

FOREIGN PATENT DOCUMENTS

CN 107401559 A 11/2017
CN 107614206 A 1/2018

(Continued)

OTHER PUBLICATIONS

International Search Report and Written Opinion for International Application No. PCT/JP2018/000857 mailed Apr. 3, 2018.

(Continued)

*Primary Examiner* — Boyer D Ashley
*Assistant Examiner* — Fernando A Ayala
(74) *Attorney, Agent, or Firm* — Renner Kenner Greive Bobak Taylor & Weber Co., LPA

(57) ABSTRACT

A connected portion 68, 68*m* is disposed at an end of one of a rotary member 41 (first rotary shaft) of a tool unit 10 and a rotary shaft 62*a* (second rotary shaft) of a driving unit 60, and a connecting portion 52, 52*m* which is connected to the connected portion 68, 68*m* is disposed at an end of the other thereof. The connected portion 68, 68*m* has a guide shaft 68*a* that rotates integrally with the rotary member 41 or the rotary shaft 62*a*, and a plurality of engaged portions 68*b*, 68*p* disposed around the guide shaft 68*a*. The connecting portion 52, 52*m* has a guide hole 52*a* into which the guide shaft 68*a* is inserted, and the engaging portions 52*b*, 52*q* with which the engaged portions 68*b*, 68*p* are engaged and which are disposed around the guide hole 52*a*.

14 Claims, 9 Drawing Sheets

(56) References Cited

U.S. PATENT DOCUMENTS 4,028,803 A * 6/1977 Currie .................... A47G 21/08 30/321
4,255,946 A * 3/1981 Hansen ................. F16D 43/206 464/36
4,458,418 A 7/1984 McSmith
4,757,786 A * 7/1988 Ellegard ................. B27B 17/10 403/348
5,272,811 A 12/1993 Armand
5,391,091 A * 2/1995 Nations .............. H01R 12/7047 439/378
5,564,981 A * 10/1996 Iwabuchi .................. F16D 3/68 464/92
5,738,469 A * 4/1998 Hsu ....................... B23B 45/008 408/124
5,907,970 A * 6/1999 Havlovick .............. F02B 63/00 403/3
6,551,037 B2 * 4/2003 Gifford .................... B23Q 3/12 408/239 R
6,855,888 B2 * 2/2005 Jacke ...................... H01R 13/59 439/462
7,883,423 B2 * 2/2011 Kubota ..................... F16D 3/68 464/73
9,421,675 B2 * 8/2016 Yu ......................... B25B 23/141
9,650,879 B2 * 5/2017 Broussard ............... F04D 29/66
10,093,010 B2 10/2018 Chiasson
2004/0185945 A1 * 9/2004 Barron ...................... F16D 3/04 464/157
2007/0293325 A1 * 12/2007 Matsumoto ............... F16D 3/68 464/104
2008/0136125 A1 * 6/2008 Hirt ....................... B25B 23/141 279/103
2011/0294583 A1 * 12/2011 Hocking ................. E21B 17/07 464/18
2011/0306283 A1 * 12/2011 Kresge .................. B24B 27/027 451/344
2013/0174424 A1 * 7/2013 Whited ..................... F16C 1/06 464/7
2013/0233669 A1 * 9/2013 Zhao ....................... F16D 11/00 192/69.8
2014/0034149 A1 2/2014 Kimura
2016/0363510 A1 * 12/2016 Kanack ................... B25B 27/10
2017/0063002 A1 * 3/2017 Daughtry ............. H01R 12/722
2018/0084731 A1 3/2018 Harris
2018/0195532 A1 7/2018 Kimura
2018/0215028 A1 * 8/2018 Lau ........................... B25F 5/02
2018/0215030 A1 8/2018 Kimura
2018/0355919 A1 * 12/2018 Livengood ............. A01B 71/06
2019/0186550 A1 * 6/2019 Bergman ................ F16D 11/14
2023/0258266 A1 * 8/2023 Vincent ................ F16J 15/3464 277/358

FOREIGN PATENT DOCUMENTS

CN 206918036 U 1/2018
EP 2551529 A2 1/2013
JP 2010-280011 A 12/2010
WO 03/064091 A1 2/2003
WO 2012/144465 A1 4/2012

OTHER PUBLICATIONS

Extended European Search Report for International Application No. PCT/JP2018/000857 dated Aug. 12, 202.
Chinese Office Action dated May 25, 2022 issued in the corresponding Chinese Application No. 201810145691.2 with English translation.

* cited by examiner

HYDRAULIC DEVICE

CROSS-REFERENCE TO RELATED APPLICATION

This is a continuation-in-part of U.S. patent application Ser. No. 16/765,562, filed on May 20, 2020, the entire contents all of which are incorporated herein by reference.

TECHNICAL FIELD

The present invention relates to a hydraulic device that includes a tool unit having a tool that operates by pressure oil generated by a hydraulic pump, and a driving unit that is detachably mounted to the tool unit and has a motor for driving rotation of a rotary member disposed in the hydraulic pump of the tool unit.

BACKGROUND ART

Hitherto, a portable hydraulic device has been used for rescue purposes, and one example thereof is disclosed in Japanese Laid-Open Patent Publication No. 2010-280011. The hydraulic device disclosed in Japanese Laid-Open Patent Publication No. 2010-280011 includes a hydraulic pressure generating unit having a battery, an electric motor supplied with power from the battery, and a hydraulic pump driven by the electric motor, and a head unit which is detachably mounted to the hydraulic pressure generating unit and which has a tip tool driven by pressure oil generated by the hydraulic pressure generating unit. As the tip tool to be disposed in the head unit, various kinds of tools such as a cutter and a spreader are prepared, and a wide variety of works can be handled by replacing the head unit. In addition, by making the hydraulic pressure generating unit and the head unit separable from each other, the portability can be improved and the burden on a worker at a site can be reduced.

SUMMARY OF THE INVENTION

The portable hydraulic device may include a driving unit and a head unit (tool unit). The driving unit has an electric motor. The head unit is detachably mounted to the driving unit, and has a hydraulic pump which is driven to rotate by the electric motor of the driving unit and a tip tool that operates by hydraulic pressure generated by the hydraulic pump. In this case, a detachably mountable torque transmission joint for transmitting a torque from a driving-side rotary shaft to a driven-side rotary shaft needs to be disposed between the driving unit and the head unit.

In consideration of a rescue purpose, the torque transmission joint needs to be quickly joined and separated. An interlock-type (key/key groove type, dog clutch type, and the like) torque transmission joint requires the driving-side rotary shaft and the driven-side rotary shaft to be in rotation phase with each other when joined, and time for the joining work increases. When a magnetic joint is used as the torque transmission joint. separation work becomes bothersome and the structure becomes complicated to increase cost.

The present invention has been made in view of such circumstances, and an object of the present invention is to provide a hydraulic device that allows a driven-side rotary shaft (first rotary shaft) of a tool unit and a driving-side rotary shaft (second rotary shaft) of a driving unit to be easily joined to and separated from each other, and that has a rotational torque transmission means (transmission joint) obtained at low cost.

A hydraulic device of the present invention includes: a tool unit having a hydraulic pump for generating pressure oil by rotation of a rotary member, a first rotary shaft connected to the rotary member, and a tool that operates by the pressure oil generated by the hydraulic pump: a driving unit having a motor for driving rotation of the rotary member of the hydraulic pump, and a second rotary shaft rotated by the motor, the driving unit being detachably mounted to the tool unit, and a connected portion is disposed at an end of one of the first rotary shaft of the tool unit and the second rotary shaft of the driving unit, and a connecting portion which is connected to the connected portion is disposed at an end of the other thereof, the connected portion has a guide shaft that rotates integrally with the first rotary shaft or the second rotary shaft. and a plurality of engaged portions disposed around the guide shaft, and the connecting portion has a guide hole into which the guide shaft is inserted, and engaging portions with which the engaged portions are engaged and which are disposed around the guide hole.

In the hydraulic device as described above, the engaged portions may be projections, and the engaging portions may be recesses into which the projections fit.

In this case, a tip of each projection may be tilted relative to a longitudinal direction of the guide shaft, and may be tilted relative to a surface orthogonal to the longitudinal direction of the guide shaft.

Also, a projection may be disposed between the recesses, and a tip of the projection may be tilted relative to a longitudinal direction of the guide hole, and may be tiled relative to a surface orthogonal to the longitudinal direction of the guide hole.

In the hydraulic device as described above, the engaged portions may be recesses, and the engaging portions may be projections that fit into the recesses.

The hydraulic device as described above may further include a torque transmission connecting tool configured to be detachably mounted to the tool unit at one end, and detachably mounted to the driving unit at the other end, and configured to transmit a rotational torque generated by the motor of the driving unit to the rotary member of the tool unit, and the torque transmission connecting tool may have a rod-like shaft having flexibility, and a cover that has flexibility and covers an outer circumferential surface of the shaft, and the torque transmission connecting tool transmits a rotational torque generated by the motor of the driving unit, by rotation of the shaft in the cover, to the rotary member of the tool unit, the flexibility of each of the shaft and the cover may allow the torque transmission connecting tool to be bent, and the torque transmission connecting tool may have, at both ends thereof, a connecting portion to which the connected portion disposed at the end of one of the first rotary shaft of the tool unit and the second rotary shaft of the driving unit is connected. and a connected portion which is connected to the connecting portion disposed at the end of the other thereof.

DESCRIPTION OF THE PREFERRED EMBODIMENTS

Figure 1:
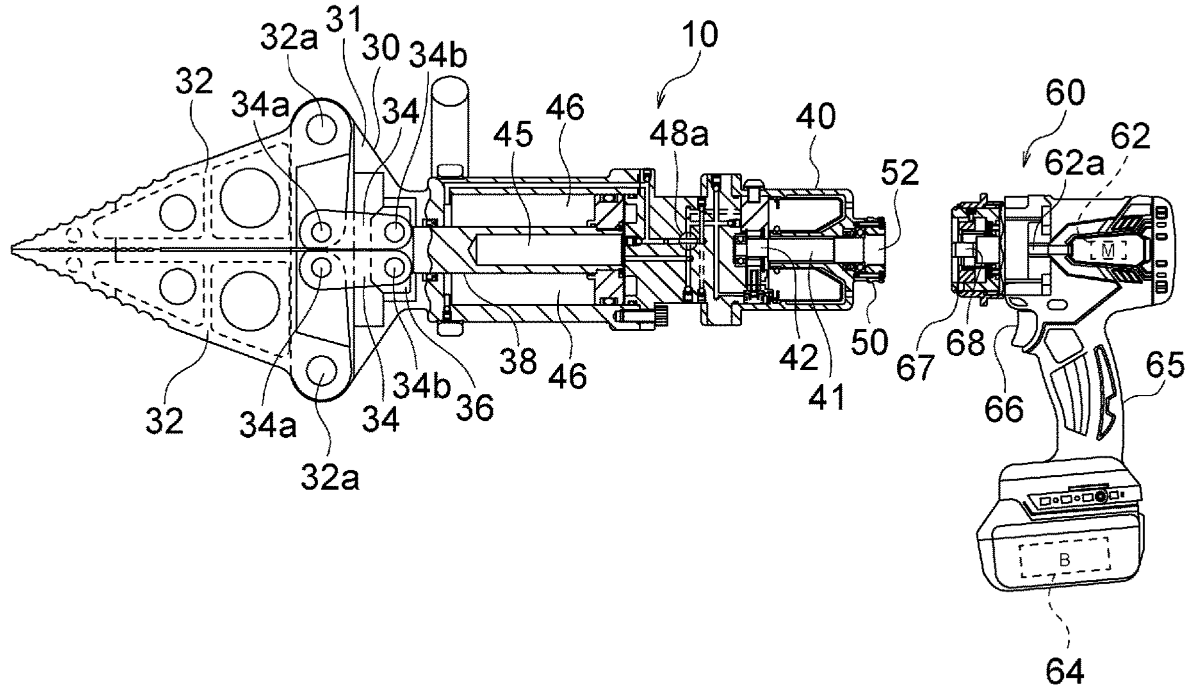
FIG. 1 is a side view illustrating, as a cross-sectional view, a part of a tool unit and a driving unit which are separated from each other, in a hydraulic device according to an embodiment of the present invention.
Figure 2:
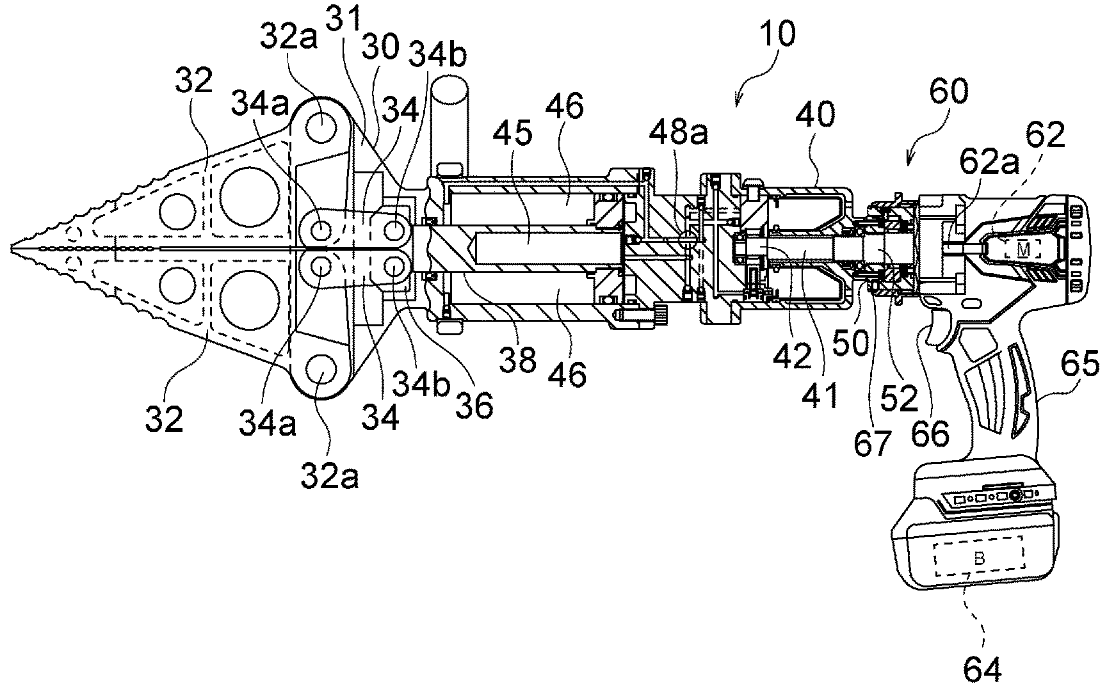
FIG. 2 is a side view illustrating, as a cross-sectional view, a part of the tool unit and the driving unit which are connected to each other, in the hydraulic device shown in FIG. 1.
Figure 3:
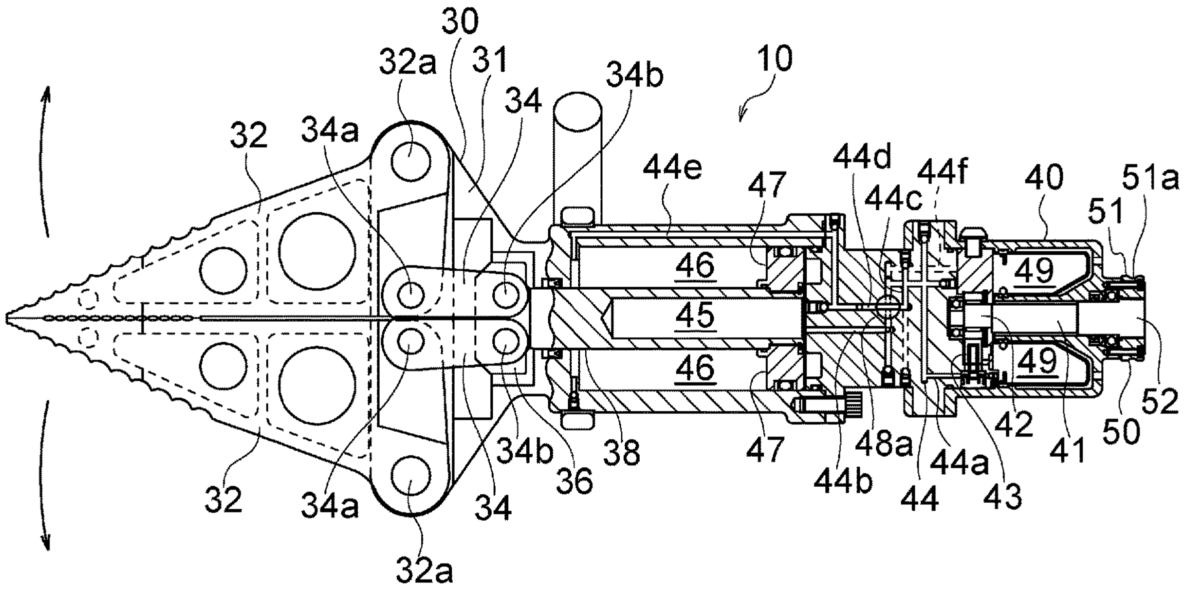
FIG. 3 is a side view illustrating, as a cross-sectional view, a part of a structure of the tool unit in the hydraulic device shown in FIG. 1 and FIG. 2. in detail.
Figure 4:
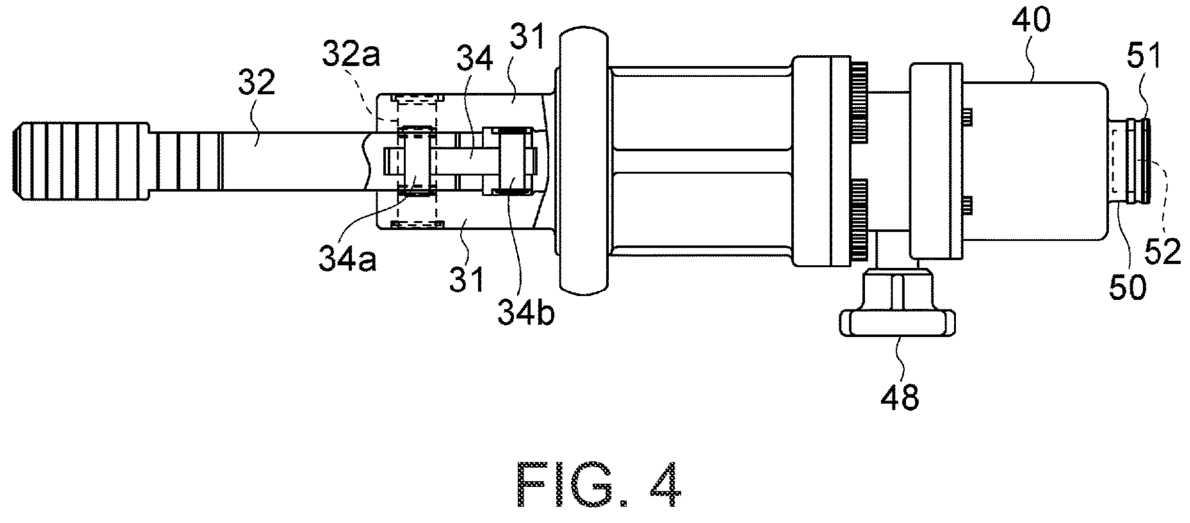
FIG. 4 is a top view of the tool unit shown in FIG. 3.
Figure 5:
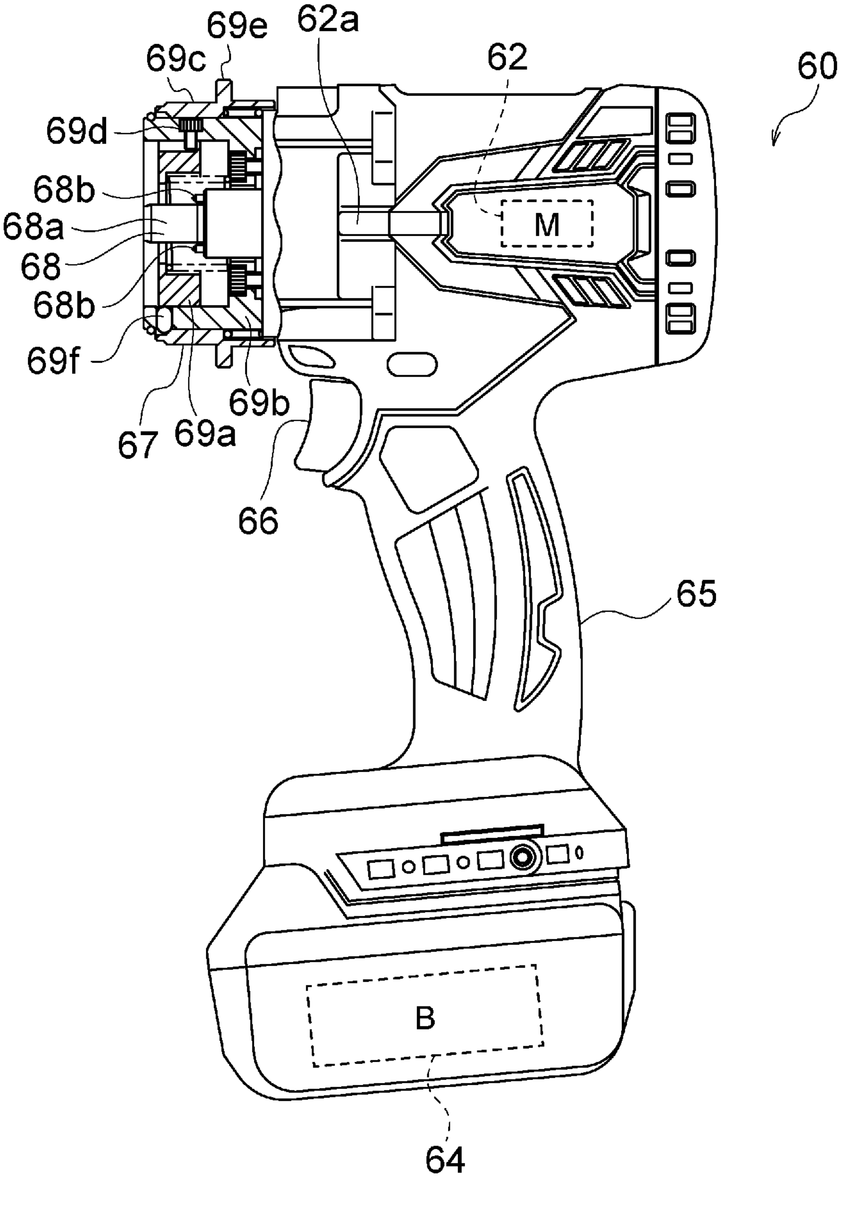
FIG. 5 is a side view illustrating, as a cross-sectional view, a part of a structure of the driving unit in the hydraulic device shown in FIG. 1, in detail.
Figure 6:
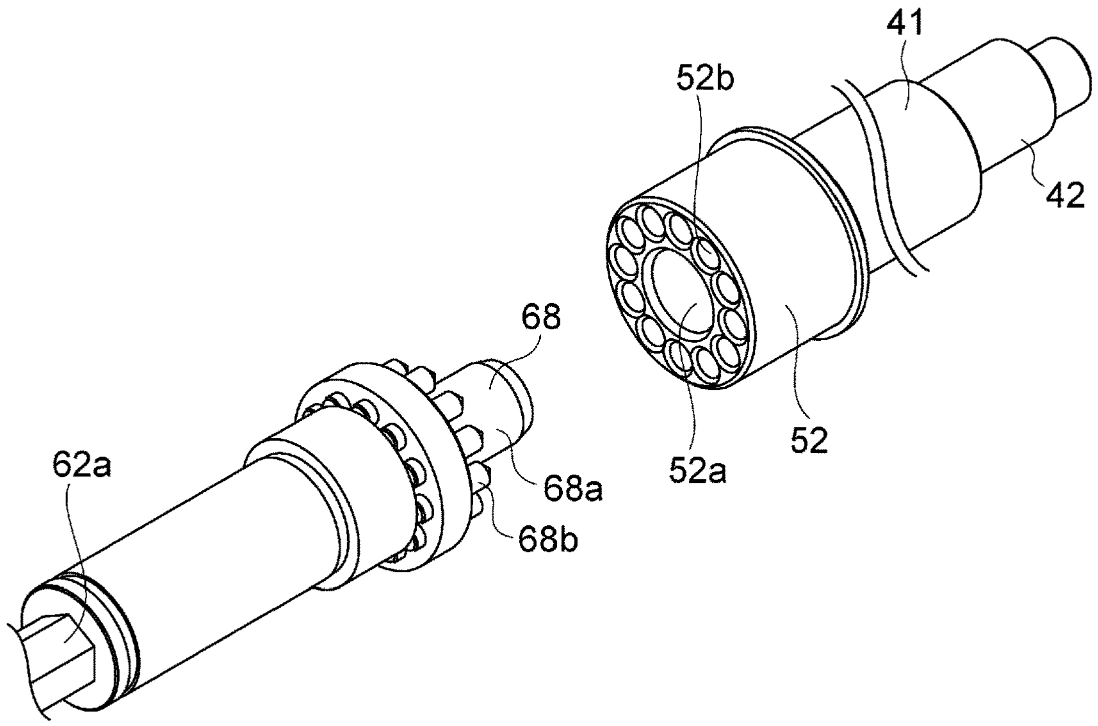
FIG. 6 is a perspective view of an example of structures of a connecting portion disposed in a mounting portion of the tool unit and a connected portion disposed in a mounted portion of the driving unit, in the hydraulic device shown in FIG. 1.
Figure 7:
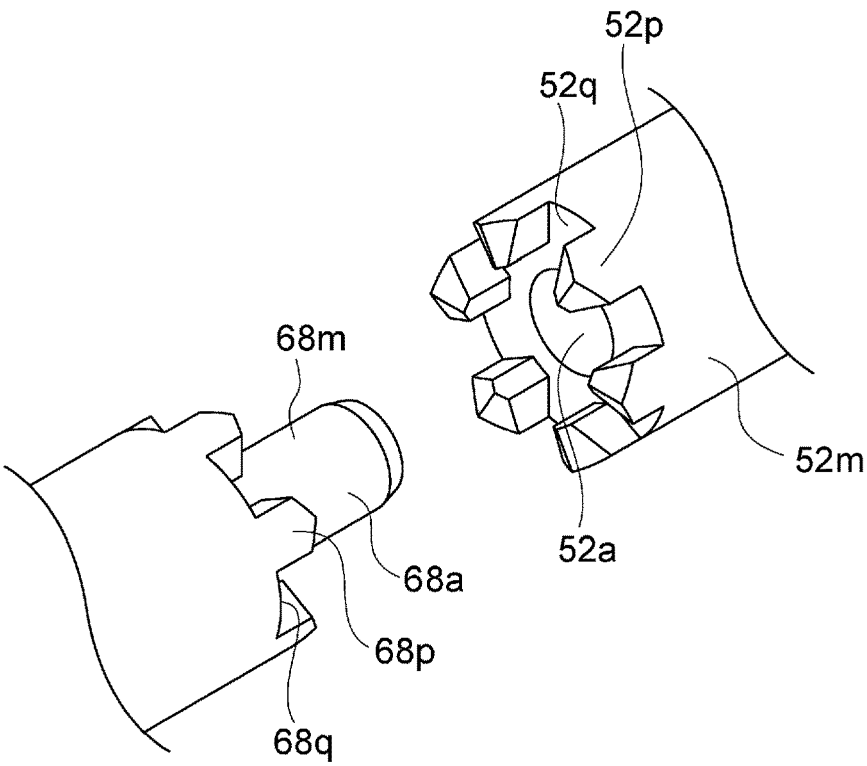
FIG. 7 is a perspective view of another example of structures of a connecting portion disposed in the mounting portion of the tool unit and a connected portion disposed in the mounted portion of the driving unit, in the hydraulic device shown in FIG. 1.
Figure 8:
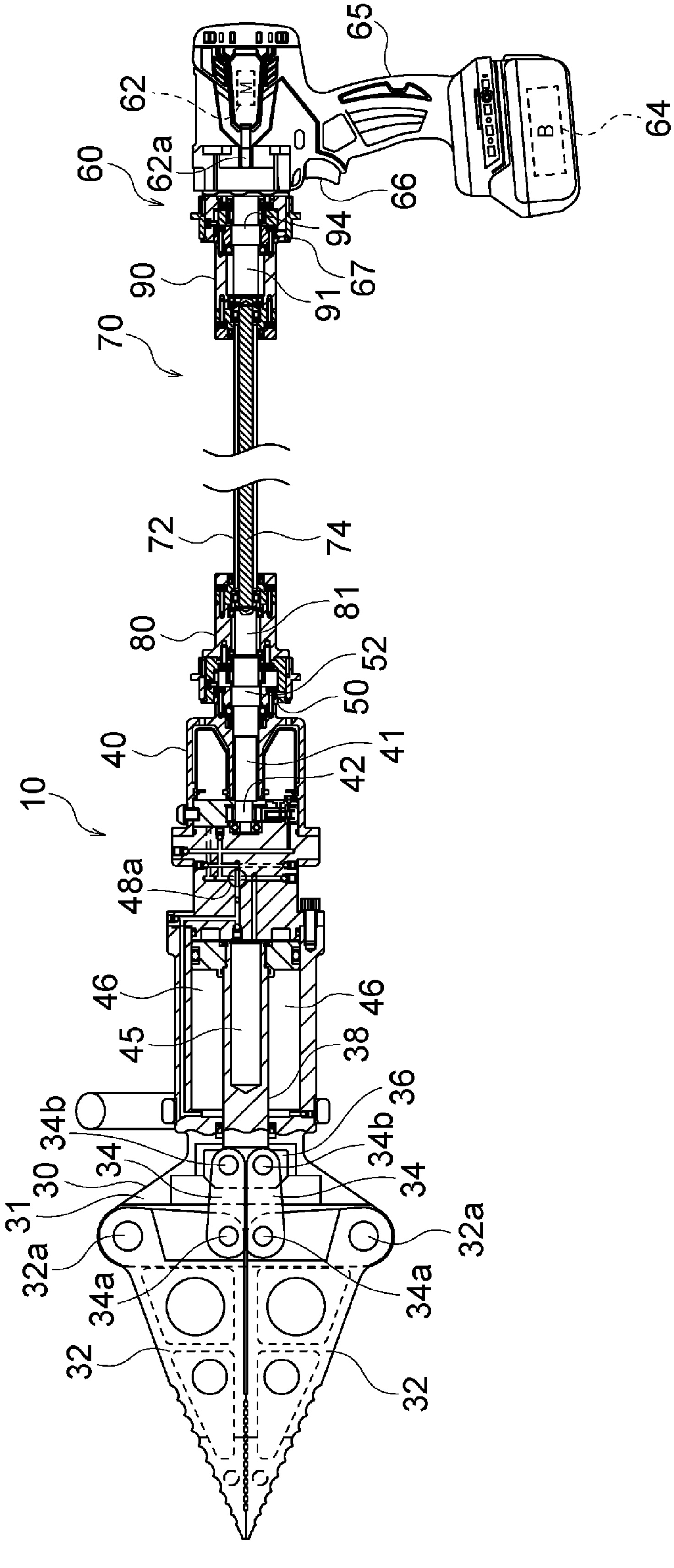
FIG. 8 is a side view illustrating, as a cross-sectional view, a part of the tool unit and the driving unit which are connected to each other by a torque transmission connecting tool in the hydraulic device shown in FIG. 1.
Figure 9:
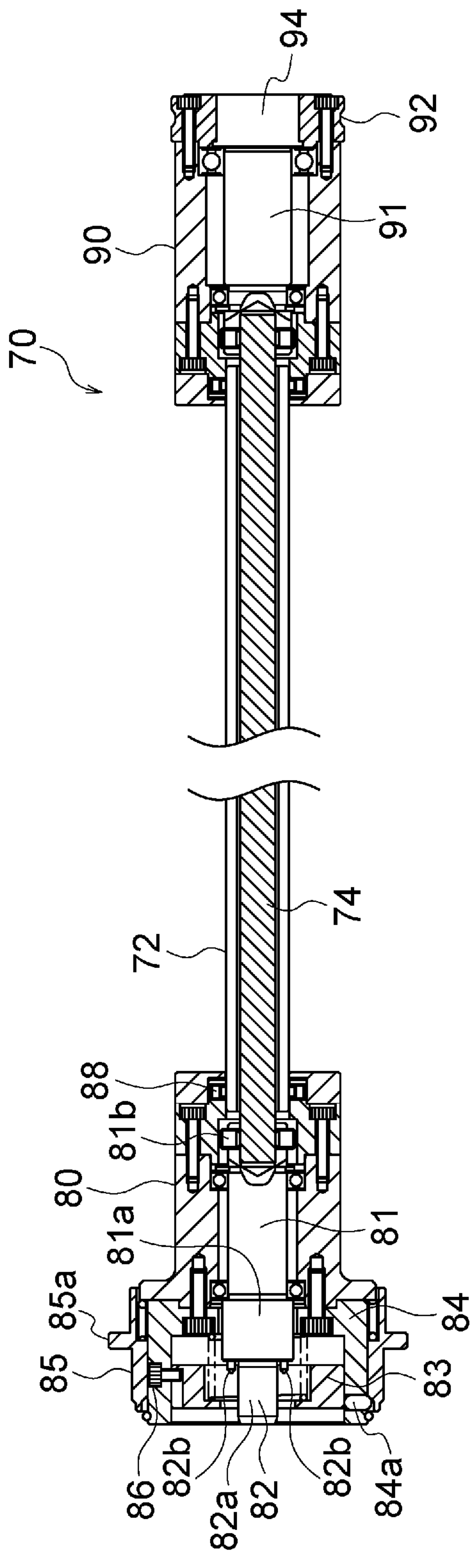
FIG. 9 is a cross-sectional view illustrating, as a side view, a structure of the torque transmission connecting tool in the hydraulic device shown in FIG. 8, in detail.
Figure 10:
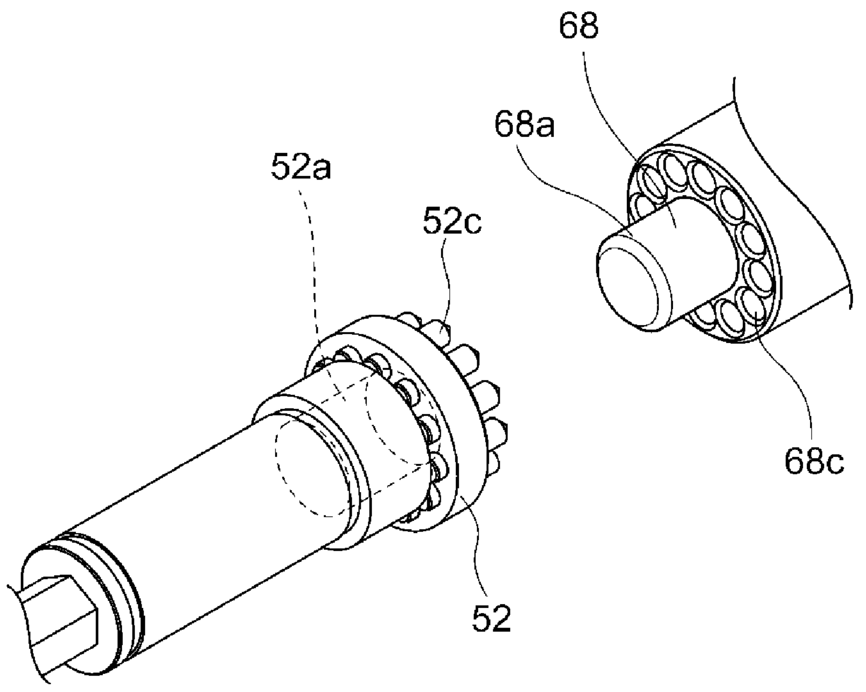
FIG. 10 is a perspective view of still another example of structures of a connecting portion disposed in the mounting portion of the tool unit and a connected portion disposed in the mounted portion of the driving unit, in the hydraulic device shown in FIG. 1.
Figure 11:
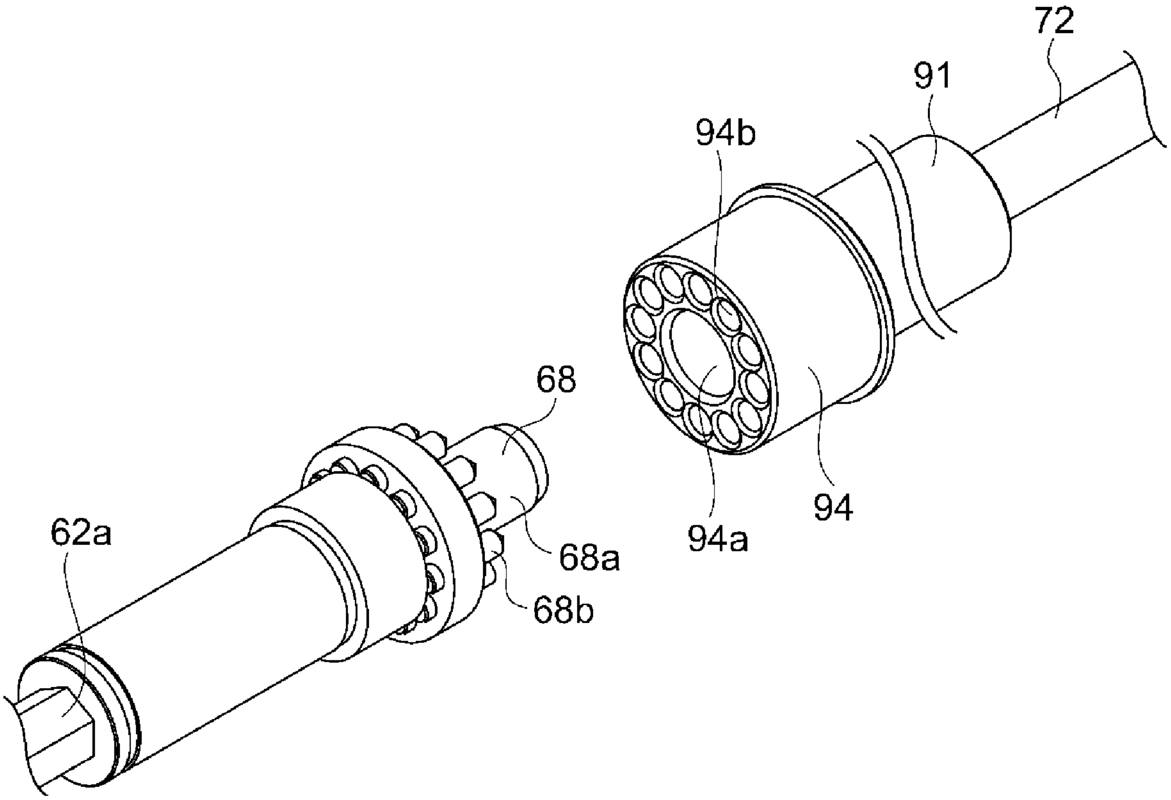
FIG. 11 is a perspective view of an example of structures of a connecting portion disposed in the mounting portion of the torque transmission connecting tool and a connected portion disposed in the mounted portion of the driving unit, in the hydraulic device shown in FIG. 8.
Figure 12:
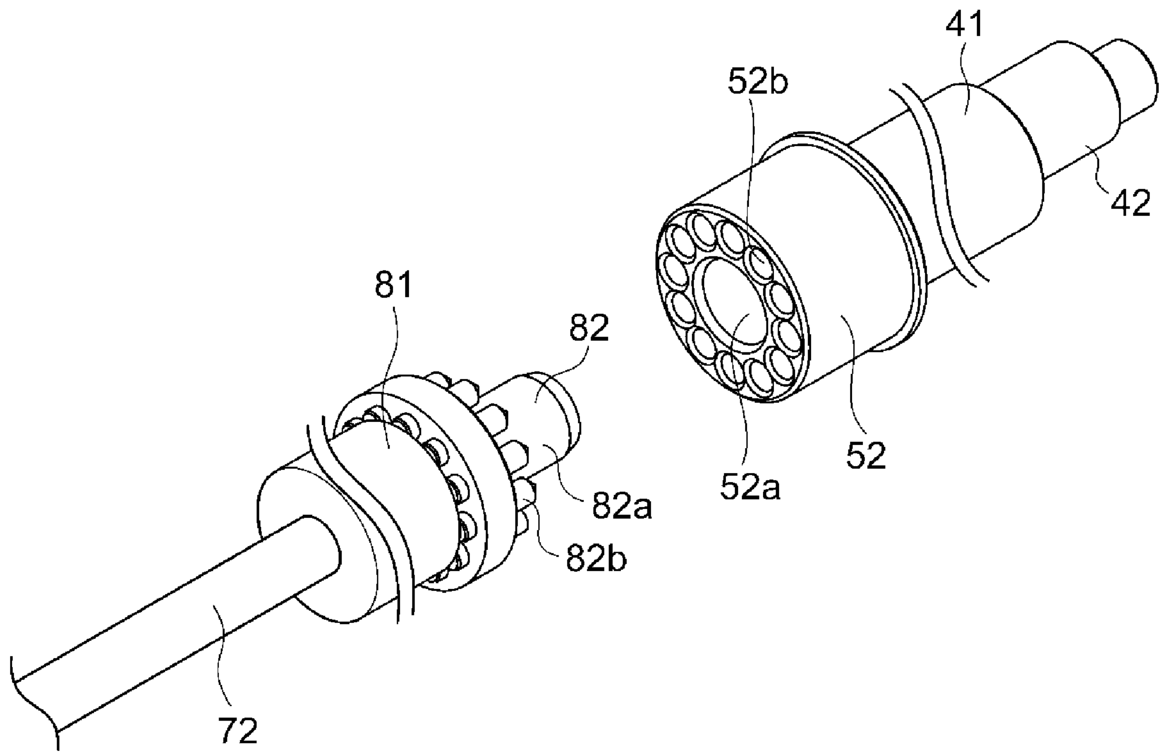
FIG. 12 is a perspective view of an example of structures of a connecting portion disposed in the mounting portion of the tool unit and a connected portion disposed in the mounted portion of the driving unit, in the torque transmission connecting tool shown in FIG. 8.

Embodiments of the present invention will be described below with reference to the drawings. A hydraulic device of the present embodiment is used for, for example, a rescue purpose, and is capable of cutting an object such as a reinforcing bar or forcibly opening an object such as a door by a tip tool such as a spreader. FIG. 1 to FIG. 9 illustrate the hydraulic device of the present embodiment, Among them, FIG. 1 is a side view illustrating, as a cross-sectional view, a part of a tool unit and a driving unit which are separated from each other, in the hydraulic device according to the present embodiment. FIG. 2 is a side view illustrating, as a cross-sectional view, a part of the tool unit and the driving unit which are connected to each other, in the hydraulic device shown in FIG. 1. FIG. 3 is a side view illustrating, as a cross-sectional view, a part of a structure of the tool unit in the hydraulic device shown in FIG. 1 and FIG. 2. in detail. FIG. 4 is a top view of the tool unit shown in FIG. 3. FIG. 5 is a side view illustrating, as a cross-sectional view, a part of a structure of the driving unit in the hydraulic device shown in FIG. 1, in detail. FIG. 6 and FIG. 7 are perspective views of various examples of structures of a connecting portion disposed in a mounting portion of the tool unit and a connected portion disposed in a mounted portion of the driving unit, in the hydraulic device shown in FIG. 1. FIG. 8 is a side view illustrating, as a cross-sectional view, a part of the tool unit and the driving unit which are connected to each other by a torque transmission connecting tool in the hydraulic device shown in FIG. 1. FIG. 9 is a cross-sectional view illustrating, as a side view, a structure of the torque transmission connecting tool in the hydraulic device shown in FIG. 8. in detail. FIG. 10 is a perspective view of still another example of structures of a connecting portion disposed in the mounting portion of the tool unit and a connected portion disposed in the mounted portion of the driving unit, in the hydraulic device shown in FIG. 1. FIG. 11 is a perspective view of an example of structures of a connecting portion disposed in the mounting portion of the torque transmission connecting tool and a connected portion disposed in the mounted portion of the driving unit, in the hydraulic device shown in FIG. 8. FIG. 12 is a perspective view of an example of structures of a ID connecting portion disposed in the mounting portion of the tool unit and a connected portion disposed in the mounted portion of the driving unit, in the torque transmission connecting tool shown in FIG. 8.

As shown in FIG. 1 and FIG. 2, the hydraulic device of the present embodiment includes a tool unit 10 and a driving unit 60. The tool unit 10 includes a hydraulic pump 40 that generates pressure oil by rotation of a rotary member 41 (described below), and a tool 30 that operates by the pressure oil generated by the hydraulic pump 40, The driving unit 60 includes a motor 62. A rotational torque generated by the motor 62 of the driving unit 60 is transmitted to the rotary member 41 of the tool unit 10. In the hydraulic device of the present embodiment, as shown in FIG. 1, the tool unit 10 and the driving unit 60 are separable from each other. Components of such a hydraulic device will be described below in detail.

Firstly, the structure of the tool unit 10 will be described in detail with reference to FIG. 3 and FIG. 4. As shown in FIG. 3. the tool unit 10 includes the hydraulic pump 40, and the tool 30 such as a spreader which operates by pressure oil generated by the hydraulic pump 40. and the hydraulic pump 40 and the tool 30 are integrated. The tool 30 has a pair of blades 32 that open and close by pressure oil. The tip portion of the closed blades 32 is inserted into a small gap of an object such as a door, and the blades 32 in this state are opened, thereby increasing the gap. Thus, for example, a door that has closed a space in which a person to be rescued is confined and that can no longer be opened by a usual means, can be forcibly opened. Furthermore, a narrow gap can be forcibly widened by hydraulic pressure with the blades 32 of the tool 30, and, therefore, the hydraulic device of the present embodiment can be used to lift a heavy object. For example, the blades 32 are opened in a state where one of the blades 32 is disposed on a hard base and the other of the blades 32 is abutted against the lower surface of an object to be lifted, thereby lifting the object. The tool of the tool unit in the hydraulic device of the present embodiment is not limited to a spreader, and the tool of the tool unit may be a tool (for example, a cutter for cutting a reinforcing bar and the like) other than a spreader as long as the tool operates by pressure oil generated by the hydraulic pump.

As shown in FIG. 3 and the like, the tool 30 includes a base portion 31, the pair of the blades 32 which are rotatable about shafts 32*a*, respectively, relative to the base portion 31, a pair of operation members 34 for operating the blades 32, respectively, and a mount member 36 attached to a piston rod 38 described below. Shafts 34*a* are disposed at the end portions of the operation members 34. respectively, and the blades 32 are attached to the shafts 34*a* so as to rotate about the shafts 34*a* relative to the operation members 34. Shafts 34*b* are disposed at the proximal end portions of the operation members 34, respectively, and the operation members 34 rotate about the shafts 34*b* relative to the mount member 36. When the mount member 36 is pushed in the leftward direction in FIG. 3 by the piston rod 38 in the state shown in FIG. 3, each operation member 34 is pushed in the leftward direction in FIG. 3 by the mount member 36, so that the operation members 34 rotate about the shafts 34*b* relative to the mount member 36 so as to separate from each other. Thus, the blades 32 that are disposed so as to rotate about the shafts 34*a* relative to the operation members 34, are pushed by the operation members 34, and rotate about the shafts 32*a* so as to separate from each other. Thus, the blades 32 in the state shown in FIG. 3 are opened in directions indicated by arrows. Meanwhile, in a case where, in a state where each blade 32 is opened, the piston rod 38 is slid in the rightward direction in FIG. 3, and the mount member 36 attached to the piston rod 38 is moved in the rightward direction in FIG. 3, each operation members 34 is drawn by the mount member 36 in the rightward direction in FIG. 3, so that the blades 32 rotate about the shafts 32*a* so as to approach each other. Thus, each blade 32 is closed into the state shown in FIG. 3.

As shown in FIG. 3 and the like, the hydraulic pump 40 has an oil chamber 49, an eccentric portion 42 attached to the end of a rod-like rotary member 41 described below, and a piston 43 that moves upward and downward by rotation of the eccentric portion 42. The eccentric portion 42 is eccentric relative to the axis of the rotary member 41, and a bearing such as a needle roller bearing is attached to the outer circumferential surface of the eccentric portion 42. The piston 43 is constantly pressed toward the outer circumferential surface of the bearing by a not-illustrated spring. Therefore, when the rotary member 41 rotates, the eccentric portion 42 and the bearing rotate eccentrically relative to the axis of the rotary member 41, whereby the piston 43 moves upward and downward, and pressure oil is sent from the oil chamber 49 toward the tool 30. to operate the tool 30.

As shown in FIG. 3 and the like, an oil path 44 for sending pressure oil from the oil chamber 49 of the hydraulic pump 40 to the tool 30 and sending back return oil from the tool 30 to the oil chamber 49 is disposed in the tool unit 10. The oil path 44 includes a first oil path 44*a,* a second oil path 44*b,* a third oil path 44*c,* and a fourth oil path 44*d*. The first oil path 44*a* and the second oil path 44*b* are defined by a core 48*a* of a switching valve 48. The first oil path 44*a* and the third oil path 44*c* connect with each other, and the third oil path 44*c* and the fourth oil path 44*d* are also defined by the core 48*a* of the switching valve 48. An oil path is also formed in the core 48*a* of the switching valve 48. When the core 48*a* is positioned as shown in FIG. 3, the oil path formed in the core 48*a* allows the third oil path 44*c* and the fourth oil path 44*d* to connect with each other. When the core 48*a* of the switching valve 48 is positioned as shown in FIG. 3, the core 48*a* disconnects the first oil path 44*a* and the second oil path 44*b* from each other. Meanwhile. when an operator rotates the switching valve 48 in the state shown in FIG. 3. to rotate the core 48*a* by 90°, the oil path formed in the core 48*a* allows the first oil path 44*a* and the second oil path 44*b* to connect with each other. In this case. the core 48*a* of the switching valve 48 disconnects the third oil path 44*c* and the fourth oil path 44*d* from each other.

As shown in FIG. 3 and the like, a second oil chamber 46 is disposed outside the piston rod 38. and the second oil chamber 46 connects with the fourth oil path 44*d* through a fifth oil path 44*e.*

As shown in FIG. 3 and the like, a return oil path 44*f* for sending back return oil from the tool 30 to the oil chamber 49 of the hydraulic pump 40 is disposed. The second oil path 44*b* and the return oil path 441 are defined by the core 48*a* of the switching valve 48. When the core 48*a* is positioned as shown in FIG. 3, the oil path formed in the core 48*a* allows the second oil path 44*b* and the return oil path 44*f* to connect with each other. The fourth oil path 44*d* and the return oil path 44*f* are also defined by the core 48*a* of the switching valve 48. When the operator rotates the switching valve 48 in the state shown in FIG. 3, to rotate the core 48*a* by 90°. the oil path formed in the core 48*a* allows the fourth oil path 44*d* and the return oil path 44*f* to connect with each other.

As shown in FIG. 3, a first oil chamber 45 is disposed in the piston rod 38, and the first oil chamber 45 connects with the second oil path 44*b.* More specifically, a flange 47 is disposed in the proximal end portion of the piston rod 38, and pressure oil sent from the second oil path 44*b* to the tool 30 enters a region rightward of the flange 47, and also enters the first oil chamber 45 disposed in the piston rod 38. Therefore, after the core 48*a* of the switching valve 48 in the state shown in FIG. 3 is rotated by 90°, the hydraulic pump 40 operates to send the pressure oil from the second oil path 44*b* into the first oil chamber 45 and the region rightward of the flange 47. and the flange 47 and the piston rod 38 are then pushed in the leftward direction in FIG. 3 and FIG. 4. Thus, when the piston rod 38 is pushed in the leftward direction in FIG. 3 and FIG. 4. the pair of the blades 32 in the tool 30 are opened in the directions indicated by the arrows in FIG. 3. At this time, the return oil is sent back from the second oil chamber 46 through the fifth oil path 44*e,* the fourth oil path 44*d,* and the return oil path 44*f* in order. respectively, into the oil chamber 49 of the hydraulic pump 40.

As described above, the second oil chamber 46 is disposed outside the piston rod 38, and the second oil chamber 46 connects with the fourth oil path 44*d* through the fifth oil path 44*e*. Therefore, in a case where the hydraulic pump 40 operates when the core 48*a* of the switching valve 48 is positioned as shown in FIG. 3, the pressure oil is sent through the third oil path 44*c,* the fourth oil path 44*d,* and the fifth oil path 44*e* in order, respectively, into the second oil chamber 46. Therefore, the flange 47 is pushed in the rightward direction in FIG. 3 and FIG. 4. so that the piston rod 38 is also pushed in the rightward direction in FIG. 3 and FIG. 4. Thus, when the piston rod 38 is pushed in the rightward direction in FIG. 3 and FIG. 4, the pair of the blades 32 in the tool 30 close. At this time, the return oil is sent back from the first oil chamber 45 through the second oil path 44*b* and the return oil path 44*f* in order, respectively, into the oil chamber 49 of the hydraulic pump 40.

A mounting portion 50 to which the driving unit 60 described below is mounted is disposed in the proximal end portion of the tool unit 10. The structure of the mounting portion 50 will be described below in detail.

Next, the structure of the driving unit 60 will be described in detail with reference to FIG. 5. As shown in FIG. 5, the motor 62 such as an electric motor is disposed in the driving unit 60. and the motor 62 allows a rotary shaft 62*a* attached to the motor 62 to rotate. The driving unit 60 has a grip portion 65 gripped by the operator with his/her hand, and the grip portion 65 has a switch 66 to be operated with a finger of the operator who grips the grip portion 65 with his/her hand. The switch 66 having such a structure acts as an operation portion for operating the motor 62. A battery 64 as a secondary battery such as a lithium ion battery or a nickel hydrogen battery is disposed in the lower side end portion of the driving unit 60. When the operator operates the switch 66, power is supplied from the battery 64 to the motor 62. A mounted portion 67. which is to be mounted to the mounting portion 50 of the tool unit 10, is disposed in the end portion of the driving unit 60. The structure of the mounted portion 67 will be described below in detail.

Next, structures of the mounting portion 50 of the tool unit 10 and the mounted portion 67 of the driving unit 60 will be described in detail with reference to FIG. 3 to FIG. 6 and FIG. 10. FIG. 6 is a perspective view of an example of the structures of a connecting portion 52 disposed in the mounting portion 50 of the tool unit 10 and a connected portion 68 disposed in the mounted portion 67 of the driving unit 60, in the hydraulic device shown in FIG. 1. FIG. 10 is a perspective view of still another example of structures of a connecting portion disposed in the mounting portion of the tool unit and a connected portion disposed in the mounted portion of the driving unit, in the hydraulic device shown in FIG. 1.

As shown in, for example, FIG. 3 and FIG. 6. the cylindrical connecting portion 52 to which the connected portion 68 of the driving unit 60 is connected is attached to the proximal end portion of the rotary member 41 in the tool unit 10, and the connected portion 68 of the driving unit 60 is attached to the end portion of the rotary shaft 62*a* that is rotated by the motor 62. As shown in FIG. 6. the connected portion 68 has a columnar guide shaft 68*a* that rotates integrally with the rotary shaft 62*a* and a plurality (for example, 12) of projection-shaped engaged portions 68*b* (projections) disposed around the guide shaft 68*a*. The engaged portions 68*b* are arranged so as to be aligned along the outer circumferential surface of the guide shaft 68*a*. Each engaged portion 68*b* is tapered and pointed so as to have a conical tip. That is, the tip of each engaged portion 68*b* is tilted relative to the longitudinal direction of the guide shaft 68*a* and is also tilted relative to the surface orthogonal to the longitudinal direction of the guide shaft 68*a*. Meanwhile, the connecting portion 52 has a guide hole 52*a* into which the guide shaft 68*a* is inserted, and a plurality (for example. 12) of enaaging portions 52*b* (recesses) which are disposed around the guide hole 52*a* and with which the respective engaged portions 68*b* are engaged. As shown in FIG. 6, the engaging portions 52*b* of the connecting portion 52 are arranged so as to be aligned along the outer circumferential edge of the guide hole 52*a*, and the engaging portions 52*b* are in adjacent contact with each other. The number of the engaged portions 68*b* and the number of the engaging portions 52*b* may be the same. or the number of the engaged portions 68*b* may be less than the number of the engaging portions 52*b*. For example, the number of the engaging portions 52*b* may be 12 and the number of the engaged portions 68*b* may be 6. When the number of the engaged portions 68*b* is plural, if one of the engaged portions 68*b* is broken and is separated from the connected portion 68, another one of the engaged portions 68*b* is engaged with the engaging portion 52*b*, to maintain connection between the connected portion 68 and the connecting portion 52.

In the present embodiment, the cross section of the guide hole 52*a* is circular. The engaged portions 68*b* are positioned symmetrically with respect to the axis center of the guide shaft 68*a*. The engaged portions 68*b* are equally spaced to line up along the circumferential direction of the guide shaft 68*a*. The engaging portions 52*b* are positioned symmetrically with respect to the center of the guide hole 52*a*. The engaging portions 52*b* are equally spaced to line up along the circumferential direction of the guide hole 52*a*.

The outer circumferential edge of each engaging portion 52*b* (recess) in the end surface of the connecting portion 52 is chamfered so as to be angled by about 45° relative to the end surface of the connecting portion 52. In the connected portion 68 and the connecting portion 52 having such structures, in a case where the connected portion 68 is to be connected to the connecting portion 52. when the guide shaft 68*a* is inserted in the guide hole 52*a* and the guide shaft 68*a* is thereafter pushed toward the inside of the guide hole 52*a*. the engaged portions 68*b* are inserted into the respective engaging portions 52*b*. In each engaged portion 68*b* and each engaging portion 52*b* having the above-described shapes, in a case where the guide shaft 68*a* is pushed toward the inside of the guide hole 52*a*, even if the engaged portions 68*b* are not aligned with the engaging portions 52*b*, the connected portion 68 rotates relative to the connecting portion 52 such that, by contact of the tapered surface disposed at the end of each engaged portion 68*b* with the outer circumferential edge of the engaging portion 52*b*, the misalignment of the engaged portions 68*b* relative to the engaging portions 52*b* is corrected. Therefore, when the guide shaft 68*a* has been pushed deeply into the guide hole 52*a*. each engaged portion 68*b* is fully inserted into the engaging portion 52*b*. When each engaged portion 68*b* has been fully inserted into the engaging portion 52*b*, the rotary shaft 62*a* of the driving unit 60 and the rotary member 41 of the tool unit 10 rotate integrally. Therefore, a rotational torque by the motor 62 of the driving unit 60 is assuredly transmitted to the rotary member 41 of the tool unit 10.

Thus, in the structures of the mounting portion 50 of the tool unit 10 and the mounted portion 67 of the driving unit 60 as shown in FIG. 3 to FIG. 6, at any rotation phase of the connected portion 68 relative to the connecting portion 52, the engaged portions 68*b* of the connected portion 68 can be engaged with the respective engaging portions 52*b* of the connecting portion 52 when the guide shaft 68*a* of the connected portion 68 is inserted into the guide hole 52*a* of the connecting portion 52. In general, for connecting the rotary shafts so as to allow power transmission, both rotary shafts such as a key and a key groove need to be prevented from rotating relative to each other. Therefore, work for matching the rotation phases of both the rotary shafts needs to be performed. Meanwhile, in the hydraulic device of the present embodiment, since the connected portion 68 and the connecting portion 52 having the above-described shapes are used, work for matching the rotation phases need not be performed. Therefore, connection of the driving unit 60 to the tool unit 10 can be substantially simplified.

The hydraulic device of the present embodiment includes a locking mechanism for fixing the tool unit 10 and the driving unit 60 with respect to the axial direction of the rotary member 41 and the rotary shaft 62*a* so as to maintain connection of the connected portion 68 of the driving unit 60 to the connecting portion 52 of the tool unit 10. Such a locking mechanism will be described below.

As shown in FIG. 5. in the mounted portion 67 of the driving unit 60, a first ring member 69*a* is disposed around the connected portion 68 so as to be spaced from the connected portion 68. A second ring member 69*b* is disposed around the first ring member 69*a*. Furthermore, a third ring member 69*c* is disposed around the second ring member 69*b*. The second ring member 69*b* is fixed relative to the mounted portion 67 so as not to be movable, whereas the first ring member 69*a* and the third ring member 69*c* are slidable relative to the second ring member 69*b* along the axial direction of the rotary shaft 62*a*.

More specifically, as shown in FIG. 5, the first ring member 69*a* is slidable along the axial direction of the rotary shaft 62*a* inside the second ring member 69*b*. Furthermore, the first ring member 69*a* is urged by a spring in the leftward direction in FIG. 5. The second ring member 69*b* has a bolt 69*d*, and displacement of the first ring member 69*a* in the leftward direction in FIG. 5 is restricted by the end portion of the bolt 69*d*.

The third ring member 69*c* is slidable along the outer circumferential surface of the second ring member 69*b* in the axial direction of the rotary shaft 62*a*. The third ring member 69*c* is urged by a spring in the leftward direction in FIG. 5. A stopper is disposed on the outer circumferential surface of the second ring member 69*b*, and restricts displacement of the third ring member 69*c* in the leftward direction in FIG. 5. A flange 69*e* that allows the operator to slide the third ring member 69*c* is disposed on the outer circumferential surface of the third ring member 69*c*.

The second ring member 69*b* has a plurality of holes that are formed along the circumferential direction so as to be spaced from each other, and pins 69*f* each having an oblong cross-section are in the respective holes. When the guide shaft 68*a* of the connected portion 68 in the driving unit 60 is inserted into the guide hole 52*a* of the connecting portion 52 in the tool unit 10 in a state where the tool unit 10 and the driving unit 60 are separated from each other, the first ring member 69*a* is pushed in the rightward direction in FIG. 5 by a pushing member 51 formed in the mounting portion 50 of the tool unit 10, When the pin 69*f* is aligned with a dent 51*a* formed in the surface of the pushing member 51, the pin 69*f* is pushed into the dent 51*a*. A force for pushing the pin 69*f* into the dent 51*a* is generated by the pin 69*f* being pressed by a tilted surface at the end portion of the third ring member 69*c* urged by the spring in the leftward direction in FIG. 5. The tilted surface is moved beyond the pin 69*f* after the pin 69*f* has been pushed into the dent 51*a*, and collides with the stopper. Thus, the pin 69*f* is inserted into the dent 51*a*, whereby the tool unit 10 and the driving unit 60 are fixed with respect to the axial direction of the rotary member 41 and the rotary shaft 62*a*.

In order to shift the connecting state shown in FIG. 2 to the separated state shown in FIG. 1, the flange 69*e* of the third ring member 69*c* is held to move the third ring member 69*c* against the force of the spring in the rightward direction in FIG. 5. Thus, the pin 69*f* can be removed from the dent 51*a*. According thereto, the first ring member 69*a* pushes the pushing member 51 disposed in the mounting portion 50 of the tool unit 10. by a force of the spring, out of the second ring member 69*b* in the leftward direction In FIG. 5. According thereto, the pin 69*f* is pushed outward by the tilted surface that is an inner surface of the dent 51*a*. Thus, the guide shaft 68*a* of the connected portion 68 in the driving unit 60 is dismounted from the guide hole 52*a* of the connecting portion 52 in the tool unit 10, to obtain the separated state shown in FIG. 1.

The hydraulic device according to the present embodiment is not limited to the above-described example, and various modifications can be made.

For example, instead of the connected portion having the guide shaft and the plurality of engaged portions around the guide shaft being disposed at the end of the rotary shaft of the driving unit, the connecting portion having the guide hole and the plurality of engaging portions around the guide hole may be disposed at the end of the rotary shaft of the driving unit. In this case, the connected portion having the guide shaft and the plurality of engaged portions around the guide shaft is disposed at the proximal end portion of the rotary member of the tool unit.

Instead of the connected portion 68 and the connecting portion 52 of the shape shown in FIG. 6, the connecting portion 68 having the guide shaft 68*a* and a plurality of engaging portions 68*c* each including a recess provided around this guide shaft 68*a*, and the connecting portion 52 having the guide hole 52*a* and a plurality of engaged portion 52*c* each including a conical projection provided around this guide hole 52*a*, respectively. may be used, as shown in FIG. 10.

In the aspect shown in FIG. 10, the guide shaft 68*a* is cylindrical and the cross section of the guide hole 52*a* is circular. The engaged portions 52*c* are positioned symmetrically about the axis center of the guide hole 52*a*. The engaged portions 52*c* are equally spaced to line up along the circumferential direction of the guide hole 52*a*. The engaging portions 68*c* are positioned symmetrically with respect to the center of the guide shaft 68*a*.

The engaging portions 68*c* are equally spaced to line up along the circumferential direction of the guide shaft 68*a*.

Instead of the connected portion 68 and the connecting portion 52 having the shapes shown in FIG. 6, a connected portion that includes a guide shaft and an engaging portion having a plurality of recesses around the guide shaft, and a connecting portion that includes a guide hole and an engaged portion having a plurality of projections around the guide hole may be used.

In the hydraulic device according to a modification, instead of the connected portion 68 and the connecting portion 52 having the shapes shown in FIG. 6. a connected portion 68*m* and a connecting portion 52*m* having the shapes shown in FIG. 7 may be used.

More specifically, in the hydraulic device according to the modification, the cylindrical connecting portion 52*m* to which the connected portion 68*m* of the driving unit 60 is connected is attached to the proximal end portion of the rotary member 41 in the tool unit 10. The connected portion 68*m* of the driving unit 60 is attached to the end portion of the rotary shaft 62*a* that is rotated by the motor 62. As shown in FIG. 7. the connected portion 68*m* includes a columnar guide shaft 68*a* that rotates integrally with the rotary shaft 62*a*. and a plurality (for example, 6) of projection-shaped engaged portions 68*p* (projections) around the guide shaft 68*a*. The engaged portions 68*p* are arranged so as to be aligned along the outer circumferential surface of the guide shaft 68*a*. Each engaged portion 68*p* has a tip that is tapered and pointed so as to form a mountain-like shape. That is, the tip of each engaged portion 68*p* is tilted relative to the longitudinal direction of the guide shaft 68*a* and is also tilted relative to the surface orthogonal to the longitudinal direction of the guide shaft 68*a*. Recesses 68*q* are formed between the engaged portions 68*p*. Meanwhile, the connecting portion 52*m* includes a guide hole 52*a* into which the guide shaft 68*a* is inserted, and a plurality (for example, 6) of engaging portions 52*q* (recesses) with which the respective engaged portions 68*p* are engaged and which are disposed around the guide hole 52*a*. As shown in FIG. 7, the engaging portions 52*q* of the connecting portion 52 are arranged so as to be aligned along the outer circumferential edge of the guide hole 52*a*. Projections 52*p* are formed between the engaging portions 52*q*. Each projection 52*p* has a tip that is tapered and pointed so as to form a mountain-like shape. That is, the tip of each projection 52*p* is tilted relative to the longitudinal direction of the rotary member 41 and is also tilted relative to the surface orthogonal to the longitudinal direction of the rotary member 41. The number of the engaged portions 68*p* and the number of the engaging portions 52*q* may be the same, or the number of the engaged portions 68*p* may be less than the number of the engaging portions 52*q*. For example, the number of the engaging portions 52*q* may be six, and the number of the engaged portions 68*p* may be three. When the number of the engaged portions 68*p* is plural, if one of the engaged portions 68*p* is broken and is separated from the connected portion 68*m*, another one of the engaged portions 68*p* is engaged with the engaging portion 52*q*, to maintain connection between the connected portion 68*m* and the connecting portion 52*m*.

In the connected portion 68*m* and the connecting portion 52*m* having such structures, in a case where the connected portion 68*m* is to be connected to the connecting portion 52*m*, when the guide shaft 68*a* is inserted in the guide hole 52*a* and the guide shaft 68*a* is thereafter pushed toward the inside of the guide hole 52*a*, the engaged portions 68*p* fit into the engaging portions 52*q*. In each engaged portion 68*p* and each engaging portion 52*q* having the above-described shapes, in a case where the guide shaft 68*a* is pushed toward the inside of the guide hole 52*a*, even if the engaged portions 68*p* are not aligned with the engaging portions 52*q*, the connected portion 68*m* rotates relative to the connecting portion 52*m* such that by contact of the mountain-shaped end of each engaged portion 68*b* with the mountain-shaped end of each projection 52*p*, the misalignment of the engaged portions 68*p* relative to the engaging portions 52*q* is corrected. Therefore, when the guide shaft 68*a* has been pushed deeply into the guide hole 52*a*, the engaged portions 68*p* fully fit into the engaging portions 52*q*. When the engaged portions 68*p* have fully fitted into the engaging portions 52*q*, the rotary shaft 62*a* of the driving unit 60 and the rotary member 41 of the tool unit 10 rotate integrally. Therefore. a rotational torque by the motor 62 of the driving unit 60 is assuredly transmitted to the rotary member 41 of the tool unit 10.

Thus, in the structures of the connected portion 68*m* and the connecting portion 52*m* as shown in FIG. 7, at any rotation phase of the connected portion 68*m* relative to the connecting portion 52*m*, the engaged portions 68*p* of the connected portion 68*m* can be engaged with the engaging portions 52*q* of the connecting portion 52*m* when the guide shaft 68*a* of the connected portion 68*m* is inserted into the guide hole 52*a* of the connecting portion 52*m*. In general, for connecting the rotary shafts so as to allow power transmission, both rotary shafts such as a key and a key groove need to be prevented from rotating relative to each other. Therefore, work for matching the rotation phases of both the rotary shafts needs to be performed. Meanwhile, in the hydraulic device of the present embodiment, since the connected portion 68*m* and the connecting portion 52*m* having the above-described shapes are used, work for matching the rotation phases need not be performed. Therefore, connection of the driving unit 60 with the tool unit 10 can be substantially simplified.

In the hydraulic device of the present embodiment, the tool unit 10 and the driving unit 60 can be connected to each other through a torque transmission connecting tool 70 having flexibility instead of the tool unit 10 and the driving unit 60 being connected directly to each other. FIG. 8 is a side view illustrating, as a cross-sectional view, a part of the tool unit 10 and the driving unit 60 which are connected to each other by the torque transmission connecting tool 70 in the hydraulic device shown in FIG. 1. FIG. 9 is a cross-sectional view illustrating, as a side view, a structure of the torque transmission connecting tool 70 in the hydraulic device shown in FIG. 8. in detail. The structure of the torque transmission connecting tool 70 will be described below in detail.

As shown in FIG. 8 and FIG. 9, the torque transmission connecting tool 70 Includes a rod-like shaft 74 having flexibility and a protective cover 72 that has flexibility and covers the outer circumferential surface of the shaft 74. The rod-like shaft 74 is formed by, for example, several layers of a steel wire of a special steel being alternately wound in the right and left directions, and the rod-like shaft 74 transmits a rotational torque and has flexibility. The rod-like shaft 74 is not limited to such a structure, and may be formed of another metal material such as stainless steel. A material other than a metal material may be used for the rod-like shaft 74 Since the shaft 74 and the protective cover 72 have flexibility, the torque transmission connecting tool 70 can be bent. A mounted portion 80 that is detachably mounted to the mounting portion 50 disposed in the proximal end portion of the tool unit 10 is disposed at one end of the protective cover 72 in the torque transmission connecting tool 70, A mounting portion 90 that is detachably mounted to the mounted portion 67 disposed in the end portion of the driving unit 60 is disposed at the other end of the protective cover 72, As shown in FIG. 9, in the mounted portion 80 of the torque transmission connecting tool 70, a rotary member 81 is connected to the end portion of the rod-like shaft 74, and a second connected portion 82 is attached to an end portion 81*a* of the rotary member 81. More specifically, an opening is formed in the proximal end portion of the mounted portion 80, and the protective cover 72 is inserted in the opening. The protective cover 72 having been inserted in the opening of the mounted portion 80 is fixed in the opening of the mounted portion 80 by a plurality (for example, 2) of screws 88. A hole is formed in the proximal end portion of the rotary member 81, and the end of the rod-like shaft 74 is inserted into the hole. The shaft 74 having been inserted into the hole of the rotary member 81 is fixed in the hole of the rotary member 81 by a plurality (for example, 4) of screws 81*b*. In the present embodiment, the mounted portion 80 having such a structure allows the torque transmission connecting tool 70 to be detachably mounted to the tool unit 10 along the axial direction of the shaft 74.

The second connected portion 82 disposed in the mounted portion 80 of the torque transmission connecting tool 70 has almost the same structure as the connected portion 68 disposed in the mounted portion 67 of the driving unit 60. Specifically, as shown in FIG. 12, the second connected portion 82 has a columnar second guide shaft 82*a* that rotates integrally with the rotary member 81. and a plurality (for example, 12) of projection-shaped second engaged portions 82*b* (projections) disposed around the second guide shaft 82*a*. Each engaged portion 82*b* is tapered and pointed so as to form a conical tip. That is, the tip of each engaged portion 82*b* is tilted relative to the longitudinal direction of the second guide shaft 82*a* and is also tilted relative to the surface orthogonal to the longitudinal direction of the second guide shaft 82*a*. The second guide shaft 82*a* of the second connected portion 82 is inserted into the guide hole 52*a* of the connecting portion 52, and the second engaged portions 82*b* of the second connected portion 82 are engaged with the engaging portions 52*b* of the connecting portion 52, whereby the second connected portion 82 is connected to the connecting portion 52. In the second connected portion 82 and the connecting portion 52 having such structures, in a case where the second connected portion 82 is to be connected to the connecting portion 52, when the second guide shaft 82*a* is inserted in the guide hole 52*a* and the second guide shaft 82*a* is thereafter pushed toward the inside of the guide hole 52*a*, the second engaged portions 82*b* are inserted into the engaging portions 52*b*. In the second engaged portions 82*b* and the engaging portions 52*b* having the above-described shapes. in a case where the second guide shaft 82*a* is pushed toward the inside of the guide hole 52*a*. even if the second engaged portions 82*b* are not aligned with the engaging portions 52*b*, the second connected portion 82 rotates relative to the connecting portion 52 such that, by contact of the tapered surface disposed at the end of each engaged portion 82*b* with the outer circumferential edge of the engaging portion 52*b*, the misalignment of the second engaged portions 82*b* relative to the engaging portions 52*b* is corrected. Therefore, when the second guide shaft 82*a* has been pushed deeply into the guide hole 52*a*, each engaged portion 82*b* is fully inserted into the engaging portion 52*b*. When each engaged portion 82*b* has been fully inserted into the engaging portion 52*b*, the rotary member 81 of the torque transmission connecting tool 70 and the rotary member 41 of the tool unit 10 rotate integrally. Therefore, a rotational torque is transmitted from the rotary member 81 of the torque transmission connecting tool 70 to the rotary member 41 of the tool unit 10.

The hydraulic device of the present embodiment includes a locking mechanism for fixing the tool unit 10 and the torque transmission connecting tool 70 with respect to the axial direction of the rotary member 41 and the rotary member 81 so as to maintain connection of the second connected portion 82 of the torque transmission connecting tool 70 to the connecting portion 52 of the tool unit 10. Such a locking mechanism has almost the same structure as the locking mechanism for fixing the tool unit 10 and the driving unit 60.

Specifically, in the mounted portion 80 of the torque transmission connecting tool 70, a first ring member 83 is disposed around the second connected portion 82 so as to be spaced from the second connected portion 82. A second ring member 84 is disposed around the first ring member 83. A third ring member 85 is disposed around the second ring member 84. The second ring member 84 is fixed relative to the mounted portion 80 so as not to be movable, whereas the first ring member 83 and the third ring member 85 are slidable relative to the second ring member 84 along the axial direction of the rotary member 81.

More specifically, as shown in FIG. 9, the first ring member 83 is slidable along the axial direction of the rotary member 81 inside the second ring member 84. Furthermore. the first ring member 83 is urged by a spring in the leftward direction in FIG. 9. The second ring member 84 has a bolt 86. and displacement of the first ring member 83 in the leftward direction in FIG. 9 is restricted by the end portion of the bolt 86.

The third ring member 85 is slidable along the outer circumferential surface of the second ring member 84 in the axial direction of the rotary member 81. The third ring member 85 is urged by a spring in the leftward direction in FIG. 9. A stopper is disposed on the outer circumferential surface of the second ring member 84. and restricts displacement of the third ring member 85 in the leftward direction in FIG. 9. A flange 85*a* that allows the operator to slide the third ring member 85 is disposed on the outer circumferential surface of the third ring member 85.

The second ring member 84 has a plurality of holes that are spaced from each other in the circumferential direction, and pins 84*a* each having an oblong cross-section are in the respective holes. When the second guide shaft 82*a* of the second connected portion 82 in the torque transmission connecting tool 70 is inserted into the guide hole 52*a* of the connecting portion 52 in the tool unit 10 in a state where the tool unit 10 and the torque transmission connecting tool 70 are separated from each other, the first ring member 83 is pushed in the rightward direction in FIG. 9 by the pushing member 51 formed in the mounting portion 50 of the tool unit 10. When the pin 84*a* is aligned with the dent 51*a* formed in the surface of the pushing member 51, the pin 84*a* is pushed into the dent 51*a*. A force for pushing the pin 84*a* into the dent 51*a* is generated by the pin 84*a* being pressed by a tilted surface at the end portion of the third ring member 85 urged by a spring in the leftward direction in FIG. 9. The tilted surface is moved beyond the pin 84*a* after the pin 84*a* has been pushed into the dent 51a. and collides with the stopper. FIG. 8 shows a state where an operation of connecting the torque transmission connecting tool 70 to the tool unit 10 has been completed. Thus. the pin 84*a* is inserted into the dent 51*a*, whereby the tool unit 10 and the torque transmission connecting tool 70 are fixed with respect to the axial direction of the rotary member 41 and the rotary member 81.

In order to shift the tool unit 10 and the torque transmission connecting tool 70 from the connecting state to the separated state, the flange 85a of the third ring member 85 is held to move the third ring member 85 against the force of the spring in the rightward direction in FIG. 9. Thus, the pin 84*a* can be removed from the dent 51*a*. According thereto, the first ring member 83 pushes the pushing member 51 disposed in the mounting portion 50 of the tool unit 10. by a force of the spring, out of the second ring member 84 in the leftward direction in FIG. 8. According thereto, the pin 84*a* is pushed outward by the tilted surface that is the inner surface of the dent 51*a*. Thus, the second guide shaft 82*a* of the second connected portion 82 in the torque transmission connecting tool 70 is dismounted from the guide hole 52*a* of the connecting portion 52 in the tool unit 10, and the tool unit 10 and the torque transmission connecting tool 70 are in the separated state.

In the hydraulic device of the present embodiment, the mounting portion 90 disposed at the other end of the shaft 74 in the torque transmission connecting tool 70 has almost the same structure as the mounting portion 50 of the tool unit 10. Specifically, as shown in FIG. 11, a rotary member 91 is mounted to the shaft 74 in mounting portion 90 of the torque transmission connecting tool 70, and a cylindrical second connecting portion 94 to which the connected portion 68 of the driving unit 60 is connected is attached to the end portion of the rotary member 91. Specifically, the second connecting portion 94 has a second guide hole 94*a* into which the guide shaft 68*a* of the connected portion 68 is inserted, and a plurality (for example, 12) of second engaging portions (recesses) 94*b* which are disposed around the guide hole 94*a* and with which the respective engaged portions 68*b* are engaged.

The hydraulic device of the present embodiment includes a locking mechanism for fixing the driving unit 60 and the torque transmission connecting tool 70 with respect to the axial direction of the rotary shaft 62*a* and the rotary member 91 so as to maintain connection of the connected portion 68 of the driving unit 60 to the second connecting portion 94 of the torque transmission connecting tool 70. Such a locking mechanism has almost the same structure as the locking mechanism for fixing the tool unit 10 and the driving unit 60. That is. the mounting portion 90 of the torque transmission connecting tool 70 includes a pushing member 92 which has almost the same structure as the pushing member 51 disposed in the mounting portion 50 of the tool unit 10. As described above, the mounted portion 67 of the driving unit 60 includes the ring members 69*a,* 69*b,* 69*c* which have almost the same structures as the ring members 83, 84, 85, respectively, disposed in the mounted portion 80 of the torque transmission connecting tool 70. Thus. the driving unit 60 and the torque transmission connecting tool 70 can be fixed with respect to the axial direction of the rotary shaft 62*a* and the rotary member 91.

The cross-section of the second guide hole 94*a* is circular. The second engaged portions 82*b* are positioned symmetrically about the axis center of the second guide shaft 82*a*. The second engaged portions 82*b* are equally spaced to line up along the circumferential direction of the second guide shaft 82*a*. The second engaging portions 94*b* are positioned symmetrically '.with respect to the center of the second guide hole 94*a*. The second engaging portions 94*b* are equally spaced to line up along the circumferential direction of the second guide hole 94*a,* The shape of each second engaged portion 82*b* is identical to the shape of each engaged portion 68*b*. The shape of each second engaging portion 94*b* is identical to the shape of each engaging portion 52*b*.

Next, an operation of the hydraulic device according to the present embodiment will be described. An example where the connected portion 68 and the connecting portion 52 shown in FIG. 6 are used will be described below. The same operation is performed also when the connected portion 68*m* and the connecting portion 52*m* shown in FIG. 7 are used.

Firstly, the operator who will use the hydraulic device of the present embodiment carries the tool unit 10, the driving unit 60, and the torque transmission connecting tool 70 which are separated from each other, and the like to a rescue site or the like. When the torque transmission connecting tool 70 is not used, the tool unit 10 and the driving unit 60 may be merely carried to the rescue site or the like. The operator firstly inserts, at the site, the tip portion of each of the blades 32 of the tool 30 of the tool unit 10 into a small gap of an object such as a door. Next, the operator connects the connected portion 68 disposed in the mounted portion 67 of the driving unit 60 to the connecting portion 52 disposed in the mounting portion 50 of the tool unit 10. The tool unit 10 and the driving unit 60 may be connected directly to each other as shown in FIG. 1 to FIG. 7, or the tool unit 10 and the driving unit 60 may be connected to each other through the torque transmission connecting tool 70 as shown in FIG. 8 and FIG. 9.

Thus, after the tool unit 10 and the driving unit 60 have been connected to each other, the switching valve 48 is rotated by 90° when the core 48*a* is in the state shown in FIG. 3. Thereafter, the operator grips the grip portion 65 of the driving unit 60. and operates the switch 66 with the finger of the operator. whereby the motor 62 operates to rotate the rotary shaft 62*a* by the motor 62. Since the connected portion 68 mounted to the end portion of the rotary shaft 62*a* of the driving unit 60 is connected to the connecting portion 52 of the tool unit 10, the rotary member 41 of the tool unit 10 also rotates in synchronization with the rotary shaft 62*a*. In a case where, as shown in FIG. 8 and FIG. 9, the tool unit 10 and the driving unit 60 are connected to each other through the torque transmission connecting tool 70. when the rotary shaft 62*a* of the driving unit 60 rotates, the rod-like shaft 74 and the rotary members 81. 91 of the torque transmission connecting tool 70 also rotate in the same direction. Furthermore. since the second connected portion 82 mounted to the end portion of the rotary member 81 of the torque transmission connecting tool 70 is connected to the connecting portion 52 of the tool unit 10, when the rotary member 81 of the torque transmission connecting tool 70 rotates. the rotary member 41 of the tool unit 10 also rotates in the same direction.

When the rotary member 41 rotates in the tool unit 10, the eccentric portion 42 mounted at the end of the rotary member 41 and the bearing eccentrically rotate relative to the axis of the rotary member 41, and, therefore, the piston 43 moves upward and downward, and pressure oil is sent from the oil chamber 49 toward the first oil chamber 45 to operate the tool 30. Specifically, the pair of blades 32 open in the directions indicated by the arrows shown in FIG. 3 by the piston rod 38 being pushed in the leftward direction in FIG. 3 and FIG. 4.

When the use of the hydraulic device of the present embodiment ends in the rescue site or the like. the operator rotates the switching valve 48 by 90° to return the core 48*a* into the state shown in FIG. 3. Thereafter, when the operator grips the grip portion 65 of the driving unit 60 and operates the switch 66 with the finger of the operator, the motor 62 operates and the rotary member 41 of the tool unit 10 also rotates. Thus, when the rotary member 41 rotates, the eccentric portion 42 and the bearing eccentrically rotate relative to the axis of the rotary member 41, and, therefore. the piston 43 moves upward and downward, and pressure oil is sent from the oil chamber 49 toward the second oil chamber 46. Thus, the piston rod 38 is pushed in the rightward direction shown in FIG. 3 and FIG. 4, whereby the pair of blades 32 close. Thereafter, the operator detaches the driving unit 60 and the torque transmission connecting tool 70 from the tool unit 10. Thus. the units and the like of the hydraulic device can be carried after the use in a state where the units and the like are separated from each other.

In the hydraulic device of the present embodiment having the above-described structure. the connected portion 68. 68*m* is disposed at the end of one of the rotary member 41 (first rotary shaft) of the tool unit 10 and the rotary shaft 62*a* (second rotary shaft) of the driving unit 60, and the connecting portion 52, 52*m* which connects to the connected portion 68. 68*m* is disposed at the end of the other of the rotary member 41 and the rotary shaft 62*a*. The connected portion 68, 68*m* includes the guide shaft 68*a* that rotates integrally with the rotary member 41 or the rotary shaft 62*a,* and a plurality of the engaged portions 68*b,* 68*p* disposed around the guide shaft 68*a*. The connecting portion 51, 52*m* includes the guide hole 52*a* into which the guide shaft 68*a* is inserted, and the engaging portions 52*b,* 52*q* which are disposed around the guide hole 52*a* and with which the engaged portions 68*b,* 68*p* are engaged. In the hydraulic device having such a structure, at any rotation phase of the connected portion 68, 68*m* relative to the connecting portion 52, 52*m,* when the guide shaft 68*a* of the connected portion 68, 68*m* is inserted into the guide hole 52*a* of the connecting portion 52, 52*m,* the engaged portions 68*b,* 68*p* of the connected portion 68, 68*m* can be engaged with the engaging portions 52*b*. 52*q* of the connecting portion 52, 52*m*. In general, for connecting the rotary shafts so as to allow power transmission, both rotary shafts such as a key and a key groove need to be prevented from rotating relative to each other. Therefore, work for matching rotation phases of both the rotary shafts need to be performed. Meanwhile, in the hydraulic device of the present embodiment, since the connected portion 68. 68*m* and the connecting portion 52, 52*m* having the above-described shapes are used, work for matching the rotation phases need not be performed. Therefore, connection of the driving unit 60 to the tool unit 10 can be substantially simplified.

In the hydraulic device of the present embodiment, as described above, the engaged portion 68*b*, 68*p* is a projection, and the engaging portion 52*b*, 52*q* is a recess into which the projection fits. The hydraulic device of the present embodiment is not limited to such an example, and the connected portion may be structured such that a plurality of engaged portions are formed as recesses around the guide shaft, and the connecting portion may be structured such that a plurality of engaging portions are formed as projections around the guide hole.

In the hydraulic device of the present embodiment, as described above, the tip of each projection used as the engaged portion 68*b*, 68*p* is tilted relative to the longitudinal direction of the guide shaft 68*a*, and is also tilted relative to the surface orthogonal to the longitudinal direction of the guide shaft 68*a*. Thus, matching of the rotation phases can be simplified. Each projection 52*p* between the recesses as the engaging portions 52*q* is tilted relative to the longitudinal direction of the guide hole 52*a* and is also tilted relative to the surface orthogonal to the longitudinal direction of the guide hole 52*a*. Also in this case, matching of the rotation phases can be simplified.

The hydraulic device of the present embodiment includes the torque transmission connecting tool 70 which is detachably mounted to the tool unit 10 at one end, is detachably mounted to the driving unit 60 at the other end, and transmits a rotational torque generated by the motor 62 of the driving unit 60 to the rotary member 41 of the tool unit 10, as described above. The torque transmission connecting tool 70 has the rod-like shaft 74 having flexibility, and the protective cover 72 that has flexibility and covers the outer circumferential surface of the shaft 74. Rotation of the shaft 74 in the protective cover 72 transmits a rotational torque generated by the motor 62 of the driving unit 60 to the rotary member 41 of the tool unit 10. The torque transmission connecting tool 70 has, at both ends thereof, the second connecting portion 94 to which the connected portion 68 disposed at the end of one of the rotary member 41 of the tool unit 10 and the rotary shaft 62*a* of the driving unit 60 is connected, and the second connected portion 82 which is connected to the connecting portion 52 disposed on the end of the other of the rotary member 41 and the rotary shaft 62*a*. The hydraulic device having such a structure allows the torque transmission connecting tool 70 to be bent since the shaft 74 and the protective cover 72 have flexibility. Therefore, the tool unit 10 can be disposed alone, in a narrow place or a place in which a secondary disaster may occur, at a rescue site or the like, and the driving unit 60 is disposed so as to be distant from the narrow place or the place in which a secondary disaster may occur, by bending the torque transmission connecting tool 70, and remote operation of the tool unit 10 can be performed by using the torque transmission connecting tool 70 at a place distant from the tool unit 10. Accordingly, the hydraulic device of the present embodiment can be used in a narrow place or a place in which a secondary disaster may occur.

The hydraulic device of the present invention is not limited to the above-described embodiments, and various modifications can be made.

For example, the pump disposed in the tool unit 10 is not limited to the illustrated one. In the hydraulic device of the present invention, any type of pump that can send pressure oil by driving rotation of a component having the pump can be incorporated in the tool unit 10, Connection between the tool unit 10 and the driving unit 60, and connection between the tool unit 10 and the torque transmission connecting tool 70 are not limited to such a connection that the guide shaft of the connected portion is inserted in the guide hole of the connecting portion. Connection between the tool unit 10 and the driving unit 60, and connection between the tool unit 10 and the torque transmission connecting tool 70 may be performed in various methods other than the above-described methods.

The invention claimed is:

1. A hydraulic device comprising:

a tool unit having a hydraulic pump for generating pressure oil by rotation of a rotary member, a first rotary shaft connected to the rotary member, and a tool that operates by the pressure oil generated by the hydraulic pump; and a driving unit having a motor for driving rotation of the rotary member of the hydraulic pump, and a second rotary shaft rotated by the motor, the driving unit being detachably mounted to the tool unit, wherein a connected portion is disposed at an end of one of the first rotary shaft of the tool unit and the second rotary shaft of the driving unit, and a connecting portion which is connected to the connected portion is disposed at an end of the other one of the first rotary shaft of the tool unit and the second rotary shaft of the driving unit, the connected portion has a guide shaft that rotates integrally with the first rotary shaft or the second rotary shaft, wherein the guide shaft is cylindrical and the cross section of the guide hole is circular, and a plurality of three or more engaged portions disposed around the guide shaft, wherein the engaged portions are positioned symmetrically with respect to the axis center of the guide shaft, and wherein the engaged portions are equally spaced to line up along the circumferential direction of the guide shaft such that in a case where the guide shaft is pushed toward the inside of the guide hole, even if the engaged portions are not aligned with the engaging portions, the connected portion rotates relative to the connecting portion such that, by contact of a tapered surface disposed at the end of each engaged portion with the outer circumferential edge of the engaging portion, the misalignment of the engaged portions relative to the engaging portions is corrected, and therefore, when the guide shaft has been pushed deeply into the guide hole, each engaged portion is fully inserted into the engaging portion, the connecting portion has a guide hole into which the guide shaft is inserted, and engaging portions with which the engaged portions are engaged and which are disposed around the guide hole, each engaged portion is a conical projection, and each engaging portion is a recess into which the conical projection fits, a tip of each conical projection is tilted relative to a longitudinal direction of the guide shaft, and is tiled relative to a surface orthogonal to the longitudinal direction of the guide shaft, the hydraulic pump has an oil chamber, an eccentric portion attached to the end of a rod-like rotary member, and a piston that moves upward and downward by rotation of the eccentric portion, the eccentric portion is eccentric relative to the axis of the rotary member, and a bearing is attached to the outer circumferential surface of the eccentric portion, the piston is constantly pressed toward the outer circumferential surface of the bearing by a spring, and therefore, when the rotary member rotates, the eccentric portion and the bearing rotate eccentrically relative to the axis of the rotary member, whereby the piston moves upward and downward, and pressure oil is sent from the oil chamber toward the tool, to operate the tool, an outer circumferential edge of each engaging portion in the end surface of the connecting portion is chamfered so as to be angled by about 45° relative to the end surface of the connecting portion, thereby in a case where the connected portion is to be connected to the connecting portion, when the guide shaft is inserted in the guide hole and the guide shaft is thereafter pushed toward the inside of the guide hole, the engaged portions are inserted into the respective engaging portions, and in a case where the guide shaft is pushed toward the inside of the guide hole, even if the engaged portions are not aligned with the engaging portions, the connected portion rotates relative to the connecting portion such that, by contact of the tapered surface disposed at the end of each engaged portion with the outer circumferential edge of the engaging portion, the misalignment of the engaged portions relative to the engaging portions is corrected, and the hydraulic device further includes a locking mechanism for fixing the tool unit and the driving unit with respect to the axial direction of the rotary member and the rotary shaft so as to maintain connection of the connected portion of the driving unit to the connecting portion of the tool unit.

2. The hydraulic device according to claim 1, wherein the engaging portions are positioned symmetrically with respect to the center of the guide hole.

3. The hydraulic device according to claim 1, wherein the engaging portions are equally spaced to line up along the circumferential direction of the guide hole.

4. The hydraulic device according to claim 1, further comprising a torque transmission connecting tool configured to be detachably mounted to the tool unit at one end, and detachably mounted to the driving unit at the other end of the torque transmission connecting tool, and configured to transmit a rotational torque generated by the motor of the driving unit to the rotary member of the tool unit, wherein the torque transmission connecting tool has a rod-like shaft having flexibility, and a cover that has flexibility and covers an outer circumferential surface of the shaft, and the torque transmission connecting tool transmits a rotational torque generated by the motor of the driving unit, by rotation of the shaft in the cover, to the rotary member of the tool unit, the flexibility of each of the shaft and the cover allows the torque transmission connecting tool to be bent, the torque transmission connecting tool has, at both ends an end thereof, a second connecting portion to which the connected portion disposed at the end of one of the first rotary shaft of the tool unit and the second rotary shaft of the driving unit is connected, and, at an other end thereof, a second connected portion which is connected to the connecting portion disposed at the end of the other one of the first rotary shaft of the tool unit and the second rotary shaft of the driving unit, the second connected portion has a second guide shaft and a plurality of second engaged portions disposed around the second guide shaft, the second connecting portion has a second guide hole and second engaging portions disposed around the second guide hole, each second engaged portion is a conical projection, a tip of which is tilted relative to a longitudinal direction of the guide hole, and is tiled relative to a surface orthogonal to the longitudinal direction of the guide hole, and each second engaging portion is a recess into which the conical projection fits.

5. The hydraulic device according to claim 4, wherein the second guide shaft is cylindrical and the cross section of the second guide hole is circular.

6. The hydraulic device according to claim 5, wherein the second engaged portions are positioned symmetrically with respect to the axis center of the second guide shaft.

7. The hydraulic device according to claim 5, wherein the second engaged portions are equally spaced to line up along the circumferential direction of the second guide shaft.

8. The hydraulic device according to claim 5, wherein the second engaging portions are positioned symmetrically with respect to the center of the second guide hole.

9. The hydraulic device according to claim 5, wherein the second engaging portions are equally spaced to line up along the circumferential direction of the second guide hole.

10. The hydraulic device according to claim 4, wherein the shape of each second engaged portion is identical to the shape of each engaged portion.

11. The hydraulic device according to claim 4, wherein the shape of each second engaging portion is identical to the shape of each engaging portion.

12. A hydraulic device comprising:

a tool unit having a hydraulic pump for generating pressure oil by rotation of a rotary member, a first rotary shaft connected to the rotary member, and a tool that operates by the pressure oil generated by the hydraulic pump; and a driving unit having a motor for driving rotation of the rotary member of the hydraulic pump, and a second rotary shaft rotated by the motor, the driving unit being detachably mounted to the tool unit, wherein a connected portion is disposed at an end of one of the first rotary shaft of the tool unit and the second rotary shaft of the driving unit, and a connecting portion which is connected to the connected portion is disposed at an end of the other one of the first rotary shaft of the tool unit and the second rotary shaft of the driving unit, the connected portion has a guide shaft that rotates integrally with the first rotary shaft or the second rotary shaft, wherein the guide shaft is cylindrical and the cross section of the guide hole is circular, and a plurality of three or more engaging portions disposed around the guide shaft, wherein the engaged portions are positioned symmetrically with respect to the axis center of the guide shaft, and wherein the engaged portions are equally spaced to line up along the circumferential direction of the guide shaft such that in a case where the guide shaft is pushed toward the inside of the guide hole, even if the engaging portions are not aligned with the engaged portions, the connected portion rotates relative to the connecting portion such that, by contact of an outer circumferential edge of each engaging portion with a tapered surface disposed at the end of each engaged portion, the misalignment of the engaging portions relative to the engaged portions is corrected, and therefore, when the guide shaft has been pushed deeply into the guide hole, each engaging portion is fully inserted into the engaged portion, the connecting portion has a guide hole into which the guide shaft is inserted, and engaged portions to which the engaging portions engage and which are disposed around the guide hole, each engaged portion is a conical projection, and each engaging portion is a recess into which the conical projection fits, a tip of each conical projection is tilted relative to a longitudinal direction of the guide hole, and is tiled relative to a surface orthogonal to the longitudinal direction of the guide hole, the hydraulic pump has an oil chamber, an eccentric portion attached to the end of a rod-like rotary member, and a piston that moves upward and downward by rotation of the eccentric portion, the eccentric portion is eccentric relative to the axis of the rotary member, and a bearing is attached to the outer circumferential surface of the eccentric portion, the piston is constantly pressed toward the outer circumferential surface of the bearing by a spring, and therefore, when the rotary member rotates, the eccentric portion and the bearing rotate eccentrically relative to the axis of the rotary member, whereby the piston moves upward and downward, and pressure oil is sent from the oil chamber toward the tool, to operate the tool, an outer circumferential edge of each engaging portion in the end surface of the connecting portion is chamfered so as to be angled by about 45° relative to the end surface of the connecting portion, thereby in a case where the connected portion is to be connected to the connecting portion, when the guide shaft is inserted in the guide hole and the guide shaft is thereafter pushed toward the inside of the guide hole, the engaged portions are inserted into the respective engaging portions, and in a case where the guide shaft is pushed toward the inside of the guide hole, even if the engaged portions are not aligned with the engaging portions, the connected portion rotates relative to the connecting portion such that, by contact of the tapered surface disposed at the end of each engaged portion with the outer circumferential edge of the engaging portion, the misalignment of the engaged portions relative to the engaging portions is corrected, and the hydraulic device further includes a locking mechanism for fixing the tool unit and the driving unit with respect to the axial direction of the rotary member and the rotary shaft so as to maintain connection of the connected portion of the driving unit to the connecting portion of the tool unit.

13. The hydraulic device according to claim 12, wherein the engaging portions are positioned symmetrically with respect to the center of the guide shaft.

14. The hydraulic device according to claim 12, wherein the engaging portions are equally spaced to line up along the circumferential direction of the guide shaft.

* * * * *